United States Patent [19]

Takahashi et al.

[11] Patent Number: 5,280,376
[45] Date of Patent: Jan. 18, 1994

[54] LIGHT TRANSMISSION SYSTEM

[75] Inventors: Akira Takahashi; Keiji Okubo, both of Kamakura, Japan

[73] Assignee: Mitsubishi Denki Kabushiki Kaisha, Tokyo, Japan

[21] Appl. No.: 880,570

[22] Filed: May 8, 1992

[30] Foreign Application Priority Data

May 29, 1991 [JP] Japan ................ 3-125861

[51] Int. Cl.$^5$ ............ H04B 10/08; H04B 10/00; H04B 10/04
[52] U.S. Cl. ................ 359/161; 359/110; 359/158; 359/173; 359/183; 356/73.1
[58] Field of Search ............ 359/110, 158, 161, 155, 359/173, 183, 187, 189, 195, 194, 188; 375/27, 81, 119; 356/73.1

[56] References Cited

U.S. PATENT DOCUMENTS 4,287,606  9/1981  Lutes, Jr. et al. ............ 359/173
4,295,741 10/1981  Palma et al. ............ 356/349
4,984,884  1/1991  Ryu et al. ............ 356/73.1

FOREIGN PATENT DOCUMENTS

64-50627   2/1989  Japan ............ H04B 1/74
1-264426  10/1989  Japan ............ H04L 1/22

Primary Examiner—Herbert Goldstein
Assistant Examiner—Raphael Bacares
Attorney, Agent, or Firm—Wolf, Greenfield & Sacks

[57] ABSTRACT

An optical transmission system includes a current and standby optical transmission lines for transmitting digital information signals in parallel. An information string phase difference detector detects the phase difference between the received digital information strings from the respective optical transmission lines. The optical transmission system also includes an optical receiver arranged in the receiving side for receiving the transmitted light signals. A controller changes the wavelengths of the light signals that are received by the optical receiver, based upon the detected phase difference which is detected by the phase difference detector.

13 Claims, 7 Drawing Sheets

LIGHT TRANSMISSION SYSTEM

BACKGROUND OF THE INVENTION i) Field of the Invention

The present invention relates generally to electro-optical transmission systems and, more particularly, to breakless electro-optical transmission systems.

ii) Description of the Prior Art

Figure 1:
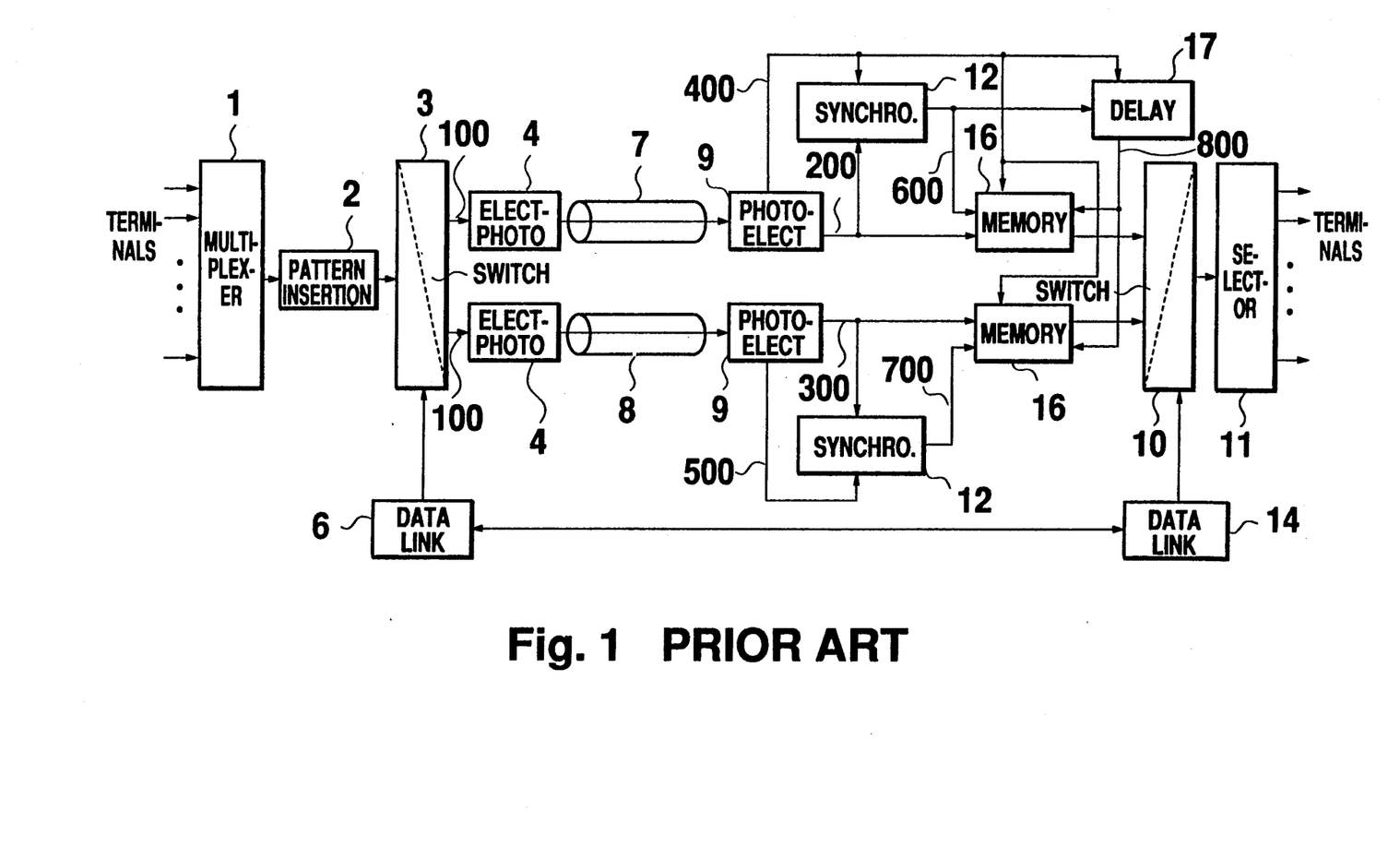
FIG. 1 is a block diagram of a conventional light transmission system.

As disclosed in Japanese Patent Laid-open No. Hei 1-264426, published on Oct. 26, 1989, a conventional light transmission system is shown in FIG. 1. FIG. 1 only shows a pair of light transmission lines, but it should be appreciated that the system includes many such pairs. Only one pair is shown so as to simplify the discussion of the system. The pair of transmission lines includes a current transmission line 7 and a standby transmission line 8. The current transmission line 7 is the currently active line, and the standby line 8 is a reserve line that is used when the current transmission line is not functioning properly. The standby line 8 enhances the reliability of the system and enables the system to operate without interruption. Generally, these lines 7 and 8 are of different lengths.

A multiplexer 1 allocates input digital information strings (i.e., strings of bits) that are supplied from a plurality of terminals (such as terminal equipment or low level multiplexers) to frames that are output. A frame is a logical structure that includes digital information strings from each of the terminals. The frames are often concatenated together into logical structures known as multi-frames. Hence, the multiplexer 1 multiplexes the digital information strings into predetermined bit positions within the multi-frame. In addition, frame synchronizing bits are provided at the beginning of each frame to designate the beginning of the frame.

Each terminal is assigned a particular time slot within each frame in which it may transmit digital information strings through the multiplexer 1. The multiplexer 1 receives digital information strings from the respective terminals in a predefined sequence that cycles through all of the terminals. For instance, in each frame the multiplexer 1 may accept eight bits from every terminal in a predefined sequence. These digital information strings are inserted into specific bit positions in the multi-frame.

Figure 2:
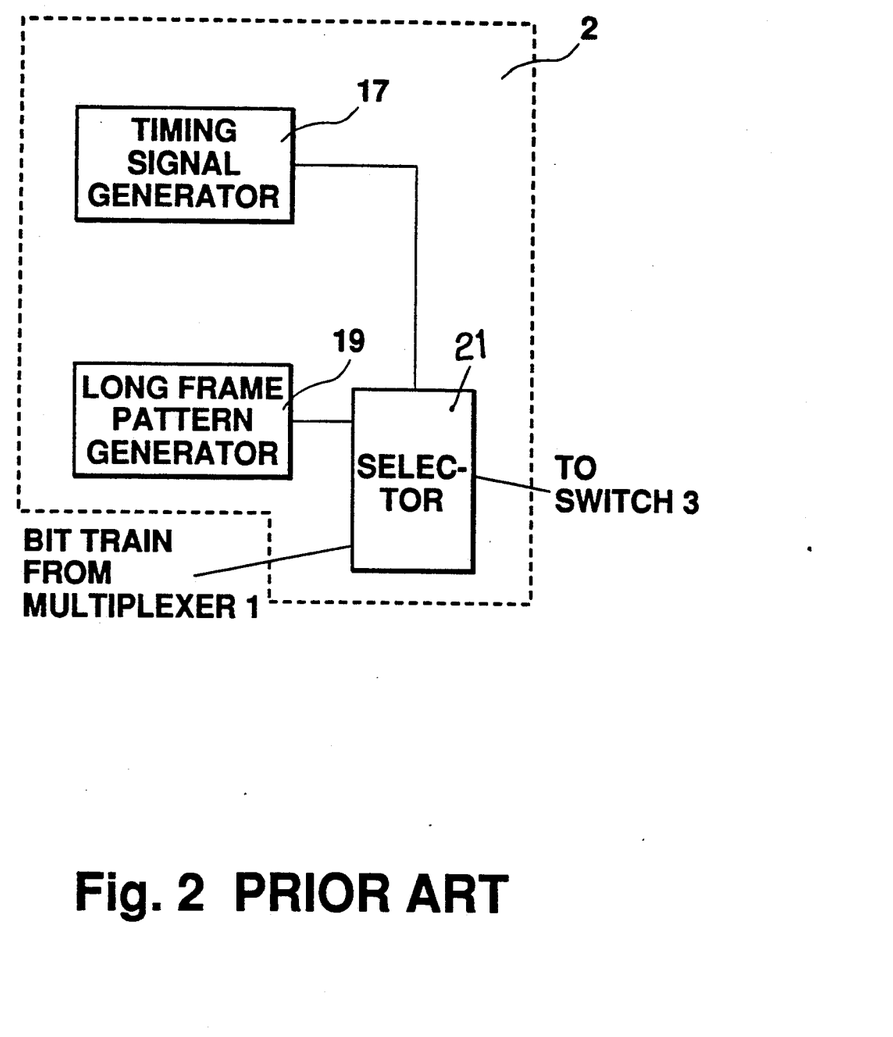
FIG. 2 is a more detailed block diagram of the pattern insertion circuit of FIG. 2.

In addition, a long frame pattern insertion circuit 2 inserts a long frame pattern (i.e. a multi-frame I.D. that identifies the multi-frame) into vacant bit positions within the multi-frame that is output from the multiplexer 1. The circuitry for the pattern insertion circuit 2 is shown in more detail in FIG. 2. The pattern insertion circuit 2 is composed of three main components: a timing signal generator 17, a long frame pattern generator 19 and a selector 21. The timing signal generator 17 indicates the time slot in which the long frame pattern is to be inserted into the multi-frame. The timing signal generator 17 sends an appropriate signal to the selector 21 so that the selector 21 chooses, as output, either the bit train from the multiplexer 1 or a long frame pattern that is produced by the long frame pattern generator 19. The timing signal generator 17 identifies a vacant time slot into which the long frame pattern is inserted. The timing signal generator 17 may be implemented as a frame counter. The long frame pattern generator 19 is responsible for generating the long frame pattern or multi-frame I.D.

The multi-frame has a length of at least two times the maximum transmission delay difference between the current light transmission line 7 and the standby light transmission line 8. This maximum transmission delay difference is the maximum difference between the time it takes a multi-frame to travel the length of the current light transmission line 7 and the time it takes the same multi-frame to travel the length of the standby light transmission line 8. This delay is determined during initialization of the system.

A sending side transmission line selector switch 3 transmits the digital information strings 100 of the multi-frame in parallel to the current and standby light transmission lines 7 and 8, in accordance with a branching instruction fed from a sending side data link circuit 6. The branching instruction designates what information is to be transmitted over the standby transmission line 8. In particular, as mentioned above, the light transmission system of FIG. 1 includes a number of current transmission lines 7. For purposes of efficiency, a single standby line may be designated for multiple current transmission lines. There are, therefore, multiple pattern insertion circuits 2 that pass information through the switch 3. The switch 3 serves primarily as a selector which selects what information is to be transmitted over the single standby transmission line 8. As such, the switch 3 may be realized as a conventional selector mechanism that is under the control of the branching instruction.

A pair of electro-photo transducers 4 each convert the electric signals of the sending information strings 100 output from the sending side transmission line selector switch 3 into light signals and send the resulting light signals in parallel down the current transmission line 7 and the standby light transmission line 8 towards a receiving side of the system.

At the receiving side, the transmitted light signals are received from the respective current and standby light transmission lines 7 and 8 by photo-electric transducers 9. The photo-electric transducers 9 convert the light signals received from the current light transmission line 7 and the standby light transmission line 8 into electrical signals that encode respective information strings 200 and 300. In addition, the photo-electric transducers reproduce bit synchronization clock signals 400 and 500 that are received from the current transmission line 7 and standby transmission line 8, respectively. A pair of long frame synchronization circuits 12 receive the respective information strings 200 and 300 and the respective bit synchronization clock signals 400 and 500 from the photo-electric transducers 9. The long frame synchronization circuits 12 use these input signals to separate the respective long frame pulses 600 and 700 from the data, and the circuits 12 output the long frame pulses to a pair of elastic store memories 16 and to a delay circuit 17. The long frame pulses 600 and 700 are used to reset the address of the memories 16 to the starting address. These long frame pulses designate the start of a new multi-frame.

The receiving information strings 200 and 300 are sent from the respective photo-electric transducers 9 to the data lines of the elastic store memories 16 and are written into the elastic store memories 16 at consecutive memory locations. The respective bit synchronization clock signals 400 and 500 are used as writing clocks for writing the digital information strings 200 and 300 into consecutive memory locations in the elastic store memories 16. The elastic store memories should each be able to hold one multi-frame.

In order to ensure synchronization of the receiving information strings 200 and 300 between the current and standby light transmission lines 7 and 8, the long frame pulse 600 is delayed by an amount of time equal to half the long frame pattern length, in the delay circuit 17, to obtain a delayed long frame pulse 800. This illustration assumes that the transmission time for the standby line 8 is delayed relative to the transmission time for the current line by one half of a multi-frame. The receiving information strings 200 and 300 are read out of the respective elastic store memories 16, upon receiving the delayed long frame pulse 800, using the bit synchronization clock signal 400 as a reading clock.

A receiving side transmission line selector switch 10 separates the information received from the memories 16 according to a separation instruction sent from a receiving side data link circuit 14. This data link circuit 14, like the sending side data link circuit 10, is used as a line for receiving and transmitting signals. These circuits 6 and 14 include a bit separating/inserting circuit for receiving and transmitting signals via a vacant time slot in the bit train.

The sending side transmission line selector switch 3 further separates the current light transmission line 7 in accordance with the separation instruction fed from the receiving side data link circuit 14 via the sending side data link circuit 6. A multiple selector 11 separates the multiplexed information string fed from the receiving side transmission line selector switch 10 into a plurality of information strings and outputs the separated information strings to a plurality of terminals.

In the conventional light transmission system, as described above, first, the synchronization of the receiving information strings between the current and standby light transmission lines is ensured by using one of the clocks read out of the pair of elastic store memories. Once the data is read from the elastic stores, the light transmission lines are switched in accordance with a breakless transmission line switching method. However, synchronization of the breakless transmission line switching method is controlled by using clocks read out of the memory and, hence, a large memory capacity is required relative to the transmission capacity. In addition, upon failure of the current line, the system must switch to the standby line. During the transition to the standby line, transmissions are often noisy and prone to error.

It is, therefore, an object of the present invention to provide a breakless electro-optical transmission system that does not require a large memory capacity relative to its transmission capacity.

It is a further object of the present invention to reduce the noise and errors in optical transmissions in a breakless electro-optical transmission system upon failure of a currently transmitting line.

SUMMARY OF THE INVENTION

The foregoing and other objects are realized by the present invention in which an optical transmission system has a sending side and a receiving side. The optical transmission system further includes first and second optical transmission lines over which light signals may be transmitted. The system has an optical transmitter that is arranged in the sending side for transmitting light signals in parallel down the first and second optical transmission lines. An optical receiver is arranged in the receiving side for receiving these transmitted light signals.

A phase difference detector detects the difference in phase at the receiving side between a light signal sent down the first optical transmission line and a corresponding light-L signal sent down the second optical transmission line. The wavelengths of the light signals received by the optical receiver are changed by a controller based upon the detected phase difference. The wavelengths of light that are received may be changed by changing the wavelengths of light that are transmitted by the optical transmitter. Likewise, the wavelengths of light may be changed by employing a light signal selector that is arranged in the receiving side. The selector selects light signals with predetermined wavelengths amongst the light signals that are received from the first and second optical transmission lines. The optical receiver may convert the light signals into electrical signals, and then the phase difference detector may detect the phase difference from these converted electrical signals.

The optical transmission system may operate as follows. First, a phase delay may be detected between when one of the light signals is received at the receiving end and when another of the light signals is received at the receiving end. Once the phase difference is determined, the wavelengths of the light signals are selected so as to substantially diminish the phase delay between light signals. This selection process may be performed at the receiving end or at the sending end.

BRIEF DESCRIPTION OF THE DRAWINGS

The above and other objects, features and advantages of the present invention will become more apparent from the following description of the preferred embodiments with reference to the accompanying drawings, in which.

DESCRIPTION OF THE PREFERRED EMBODIMENTS

Preferred embodiments of the present invention will now be described with reference to the accompanying drawings, wherein like reference characters designate like or corresponding parts throughout different views.

Figure 3:
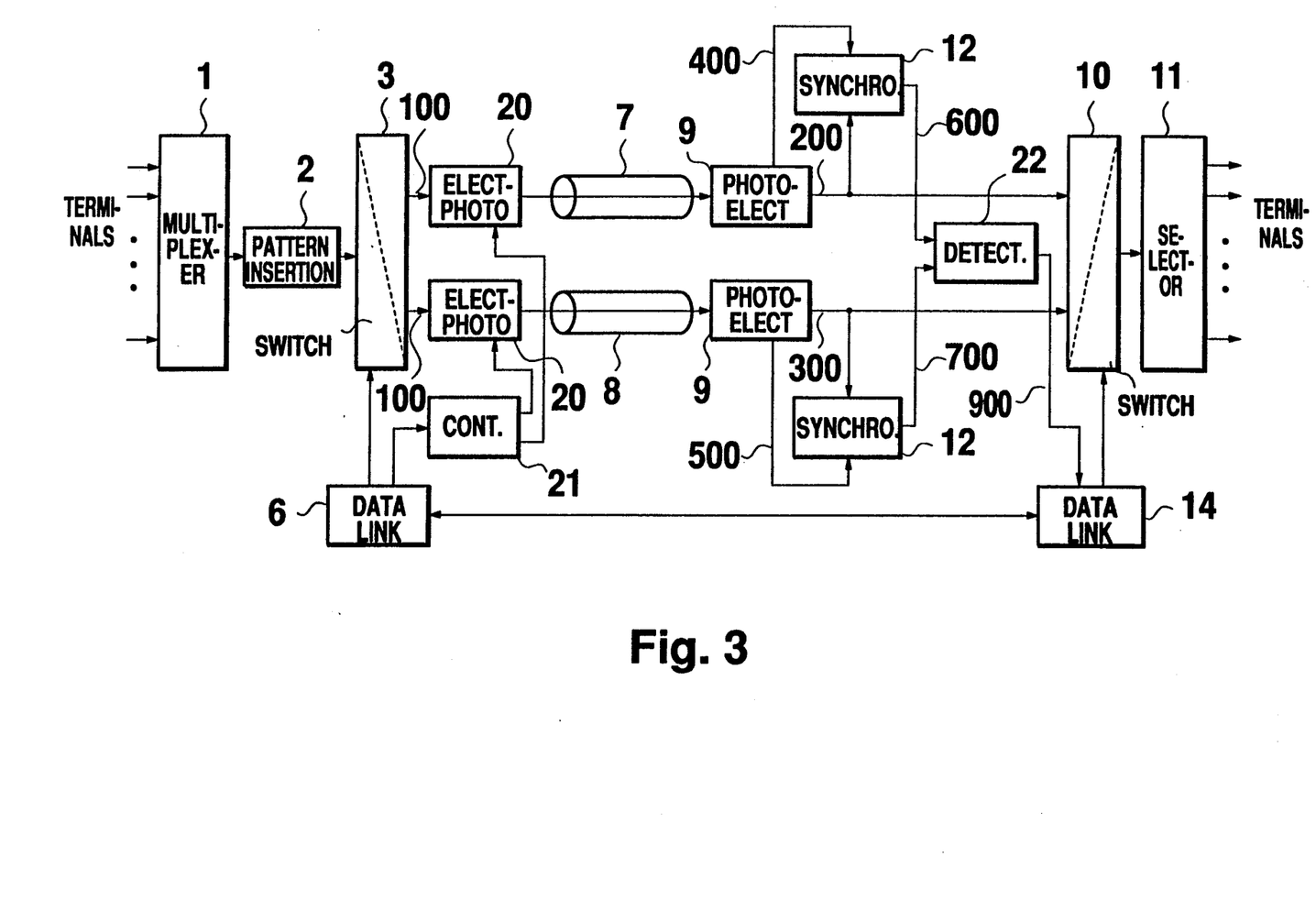
FIG. 3 is a block diagram of a first embodiment of a light transmission system according to the present invention.

FIG. 3, shows a first preferred embodiment of a light transmission system according to the present invention. In FIG. 3, multiplexer 1, long frame pattern insertion circuit 2, sending side transmission line selector switch 3, sending side data link circuit 6, current transmission line 7, standby transmission line 8, photo-electric transducers 9, receiving side transmission line selector switch 10, multiple selector 11, long frame synchronization circuits 12 and receiving side data link circuit 14 serve the same functions as the corresponding components of the conventional light transmission system shown in FIG. 1. The electro-photo conversion and light wavelength change means 20, however, differ from the transducers 4 (FIG. 1) of the conventional system.

The electro-photo conversion and light wavelength change means 20 not only convert electric signals encoding digital information strings 100 into light signals, but also adaptively change the wavelengths of the light signals. Specifically, the electro-photo conversion and light wavelength change means 20 send light signals over the current transmission line 7 and the standby light transmission line 8 that have wavelengths specified by a light wavelength change signal. The light wavelength change signal is sent from a light wavelength change controller 21. The light wavelength change controller 21 receives a phase difference signal 900 from the data link circuit 6. This phase difference signal 900 originates from an information string phase difference detector 22. The phase difference signal indicates the phase delay (i.e., the number of bits by which the signals are misaligned at the receiving side) between the signals, and the phase difference signal is passed to the receiving side data link circuit 14 and, then, on to the sending side data link circuit 6. The light control wavelength controller 21 produces a light wavelength change signal having a voltage that varies in accordance with whether the phase of the transmitted light is to be delayed or advanced.

When a switch is made from the current light transmission line 7 to the standby light transmission line 8, the digital information strings 100 being transmitted are transmitted in parallel from the sending side transmission line selector switch 3 to the photo-electric transducers 9 over the current transmission line 7 and the standby light transmission line 8. In the receiving side, the photo-electric transducers 9 output respective digital information strings 200 and 300 and also output respective bit synchronization clock signals 400 and 500 to the respective long frame synchronization circuits 12. The long frame synchronization circuits 12 reproduce and output respective long frame pulses 600 and 700 to the information string phase difference detector 22. The long frame pulses 600 and 700 are pulse strings exhibiting the same long frame pattern. The phase difference between these two long frame pulses may be detected by a suitable conventional detector. One suitable detector is a delay circuit that is positioned to receive the long frame pulses 600 and 700 as input. The outputs from the delay circuit are compared with each other. The phase difference is detected by comparing the delay times between the outputs. Whatever means is chosen to realize the information string phase difference detector 22, the detector outputs the phase difference signal 900 to the light wavelength change controller 21 via the receiving side data link circuit 14 and the sending side data link circuit 6. The light wavelength change controller 21 then generates the light wavelength change signal so that the light wavelength change signal corresponds to the phase difference signal 900. The light wavelength change signal is then supplied to the pair of electro-photo conversion and light wavelength change means 20 as described above.

The two electro-photo conversion and light wavelength change means 20 change the wavelengths of the light signals being transmitted over the current transmission line 7 and the standby transmission line 8 in accordance with the light wavelength change signal fed from the light wavelength change controller 21. In particular, the wavelengths of the light signals are selected to eliminate the detected phase difference at the receiving end. The current and light transmission lines 7 and 8 are composed of optical fibers of substantially the same material. Thus, when the wavelengths of the sending light signals are changed, the transmission speeds of the signals in the current and standby light transmission lines 7 and 8 are also changed. The change in wavelength alters the index of refraction of the material. As such, the time it takes for light of a first wavelength to travel the length of the transmission line differs from the time it takes light of a second wavelength to travel the length of the transmission line. The relationship between the wavelength and index of refraction of a transmission medium is well known.

The synchronization of the received digital information strings between the current and light transmission lines 7 and 8 is realized by selecting the wavelength of light transmitted on the current transmission line and the wavelength of light transmitted on the standby transmission line so that the light transmitted on both lines arrive in synchronization at the receiving end. After the synchronization of the receiving information strings 200 and 300 is physically ensured by changing the wavelengths of the sending light signals between the current and standby light transmission lines 7 and 8, the light transmission lines are switched. Hence, even when the receiving side transmission line selector switch 10 is switched from receiving digital information strings from the current transmission line to receiving digital information strings from the standby transmission line, no duplication of data or gaps in data result.

It should be noted that in this embodiment, the data link between the receiving side data link circuit 14 and the sending side data link circuit 6 may be realized by either a light transmission line or by using another type of data line.

Figure 4:
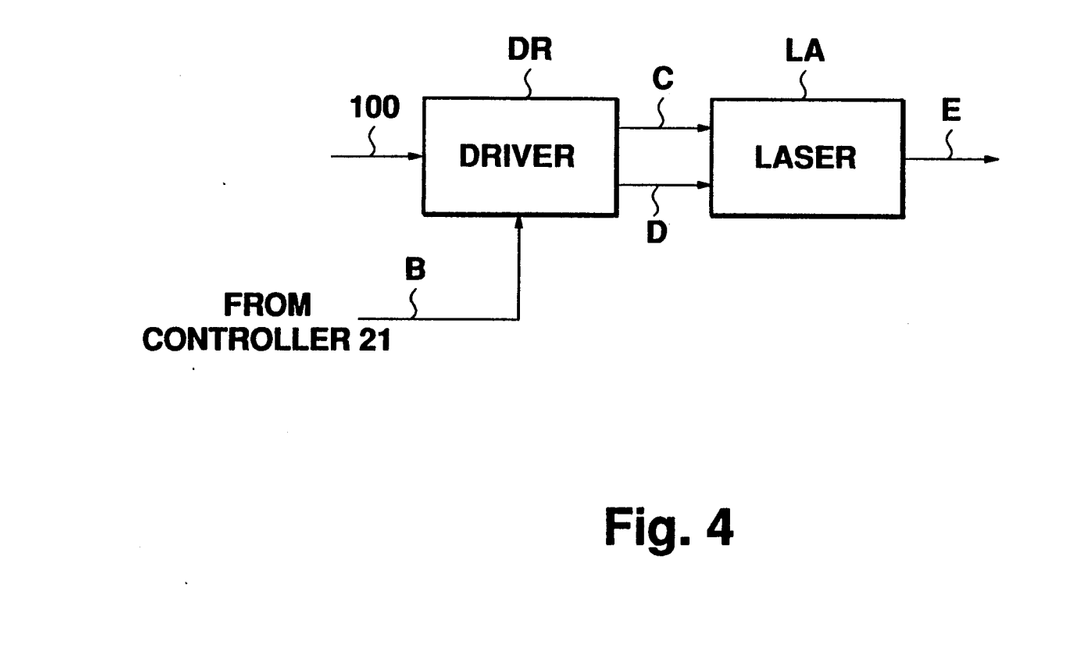
FIG. 4 is a block diagram of the electro-photo conversion and light wavelength change means of FIG. 3.

FIG. 4 shows an electro-photo conversion and light wavelength change means 20 in more detail. As discussed above, each of these means 20 not only converts the incoming electric signals into light signals but also changes the wavelength of the incoming light signals in accordance with a control signal fed from the controller 21. The electro-photo conversion and light wavelength change means 20 includes a driver circuit DR and a variable wavelength light-emitting element, such as a variable wavelength semiconductor laser LA. The driver circuit DR converts a voltage signal of the sending digital information string 100 into a light modulation current signal C. This current signal C is used for driving the variable wavelength semiconductor laser LA. The driver circuit DR also converts the light wavelength change voltage signal B into a variable light wavelength control current signal. D. The signal D is used for changing an oscillation wavelength of the variable wavelength semiconductor laser LA. The variable wavelength semiconductor laser LA outputs a light pulse signal E according to the light modulation current signal C sent from the driver DR. In addition, the laser LA changes its semiconductor refractive index according to the variable light wavelength control current signal D sent from the driver DR, so as to change the oscillation wavelength.

When the wavelength of the transmitted light changes, the refractive index of the optical fiber of the light transmission line is altered. As a result, the transmission speed of the light signals that carry the digital information strings changes. Hence, the light wavelength change signal B is adaptable to advancing and delaying of the phase of the light signals. By increasing or reducing the wavelengths of the sending light signals E for the current and standby transmission lines 7 and 8 (FIG. 3) using this signal B (FIG. 4), the described embodiment makes the phases of the information strings coincide with each other to ensure the synchronization of the information strings.

Figure 5A:
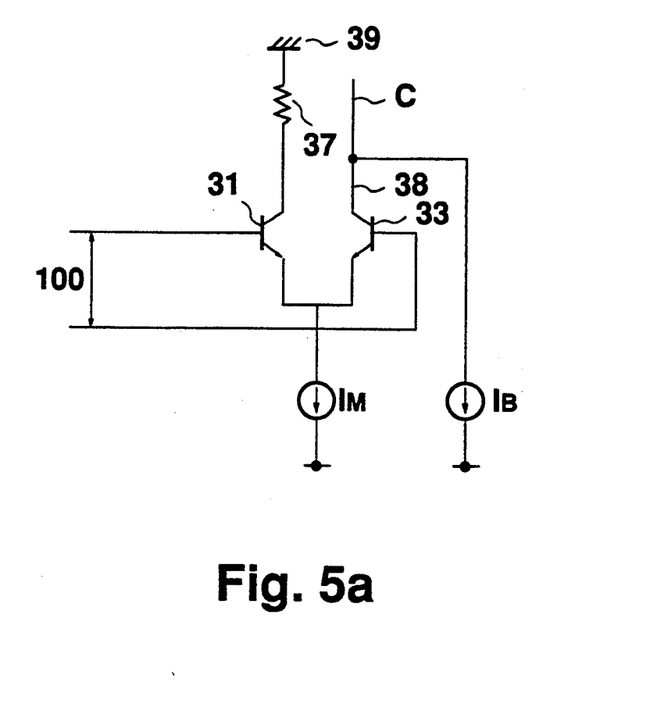
FIGS. 5a and 5b are electrical schematic diagrams of circuits that are included in the driver circuit DR of FIG. 4.

FIG. 5a provides a more detailed depiction of the circuitry included in the driver circuit DR. As shown in FIG. 5a, the digital information string voltage signal 100 is applied to the bases of transistors 31 and 33. These transistors 31 and 33 are coupled at their emitters. The junction to which the emitters are coupled is also coupled to a constant current source $I_M$. The branch 38 of the circuit that is connected to the collector of the transistor 33 includes a connection to a second constant current source $I_B$. The branch of the circuit connected to the collector of the other transistor 31 includes a resistor 37 that is coupled to ground 39. This circuit operates by applying the input voltage signal for the digital information string 100 to the bases of the respective transistors 31 and 33 so as to regulate the amount of current that flows through the branch 39. The resulting output light modulation current signal C is taken off this branch 39.

Figure 5B:
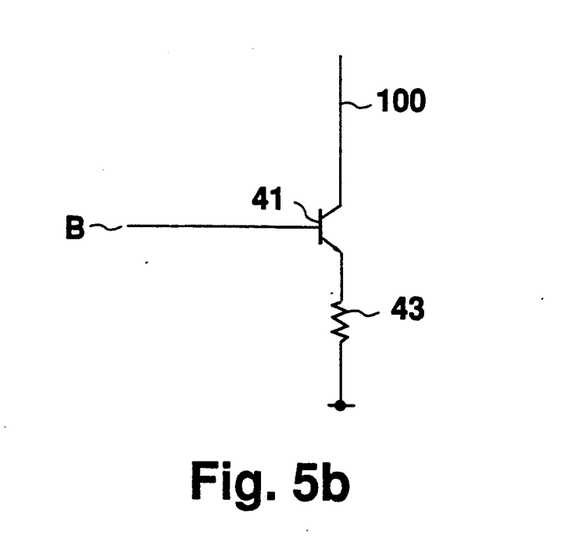

FIG. 5b shows another circuit that is found in the driver circuit DR. This additional circuit uses the light wavelength change signal to advance or delay the phase of the light signals that are emitted from the laser LA (FIG. 4). In particular, the light wavelength change signal B is applied to the base of a transistor 41. The emitter of the transistor is coupled to a resistor 43. The light wavelength change signal B is used to retard or advance the phase of the digital information string voltage signal 100 that passes to the circuit of FIG. 5a.

Figure 6:
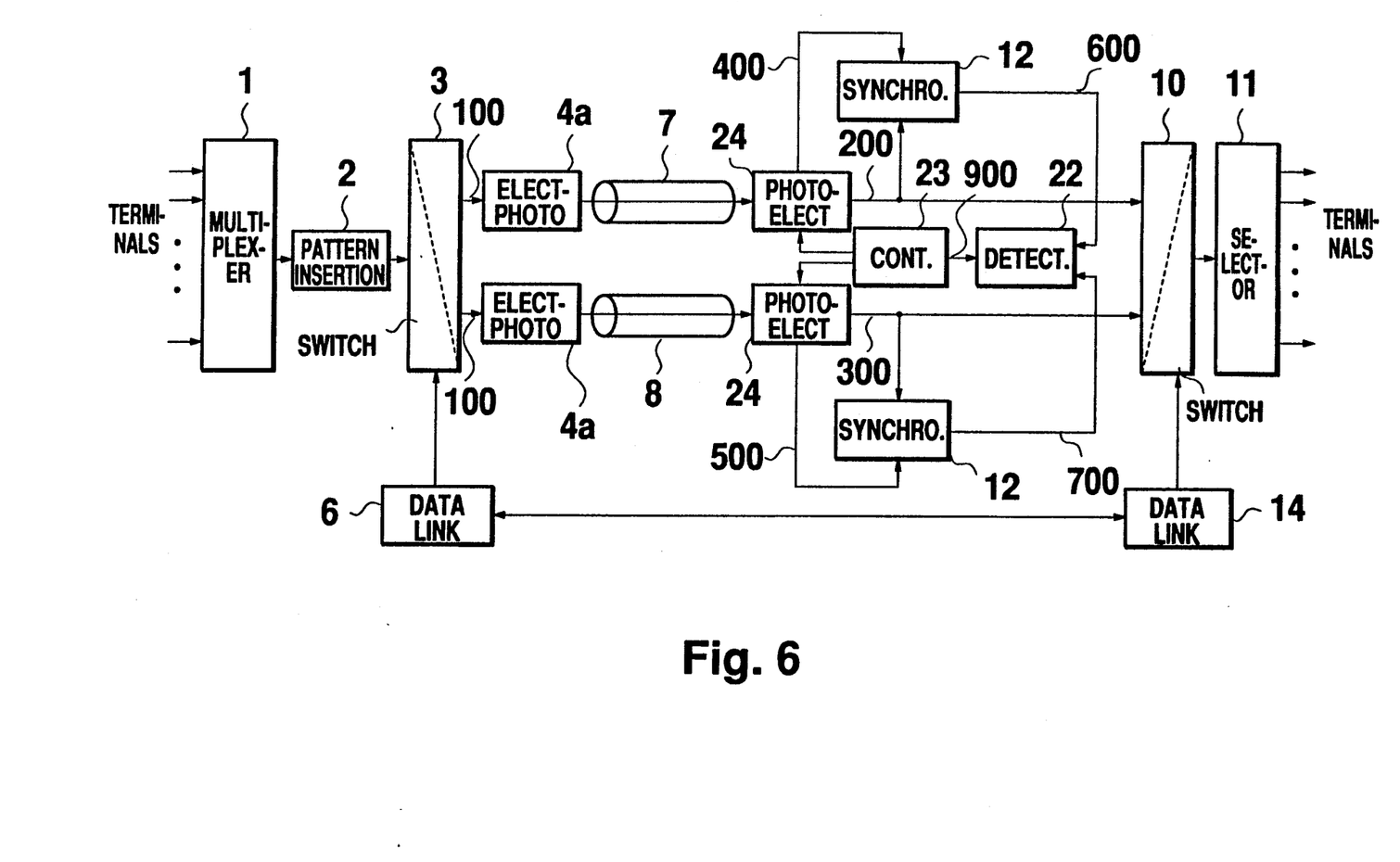
FIG. 6 is a block diagram of a second embodiment of a light transmission system according to the present invention.

FIG. 6 shows a second preferred embodiment of the light transmission system of the present invention. This second embodiment has a construction that is similar to the first embodiment shown in FIG. 2. Like numbered elements correspond to the elements previously described with reference to FIG. 2. Nevertheless, the second preferred embodiment differs in several respects. In this second embodiment, a pair of sending side electro-photo transducers 4a each receive electric signals of digital information strings 100 from a sending side transmission line selector switch 3. The transducers 4a output light signals with predetermined frequency ranges or with a plurality of wavelengths to the current transmission line 7 and the standby transmission line 8. In the receiving side, a light wavelength selection controller 23 receives the phase difference signal 900 that is output by the information string phase difference detector 22. The controller 23 uses the phase difference signal to generate light wavelength selection signals. These light wavelength selection signals are sent to the photoelectric transducers 24 to choose selective wavelengths of the receiving light signals for the current and standby lines, depending on the advancing and delaying of the phases. The pair of light wavelength selection and photo-electric transducers 24 choose the wavelengths of the receiving light signals of the current and standby light transmission lines 7 and 8 as dictated by the light wavelength selection signals. The transducers also convert the received light signals having the selected wavelengths into voltage signals of information strings 200 and 300 and reproduce synchronization clock signals 400 and 500.

In this second preferred embodiment, the received light signals have a plurality of wavelengths, and the phases of these signals are different from each other. Hence, by changing the wavelengths of the light signals that are chosen, based on the phases of the received digital information strings, in the light wavelength selection and photo-electric transducers 24, the phase difference between the digital information strings is made to be zero. In this embodiment, as described above, by choosing the wavelengths of the light signals, the synchronization of the information strings 200 and 300 received from the current transmission line 7 and the standby transmission line 8, respectively, is physically ensured. As discussed above, it takes different wavelengths of light different lengths of time to travel a given transmission line. Thus, by choosing which wavelengths to select, the system chooses a particular travel time that achieves synchronization between light signals. By switching the receiving side transmission line selector switch 10, the breakless transmission line switching is performed in the same manner as the first embodiment described above.

Figure 7:
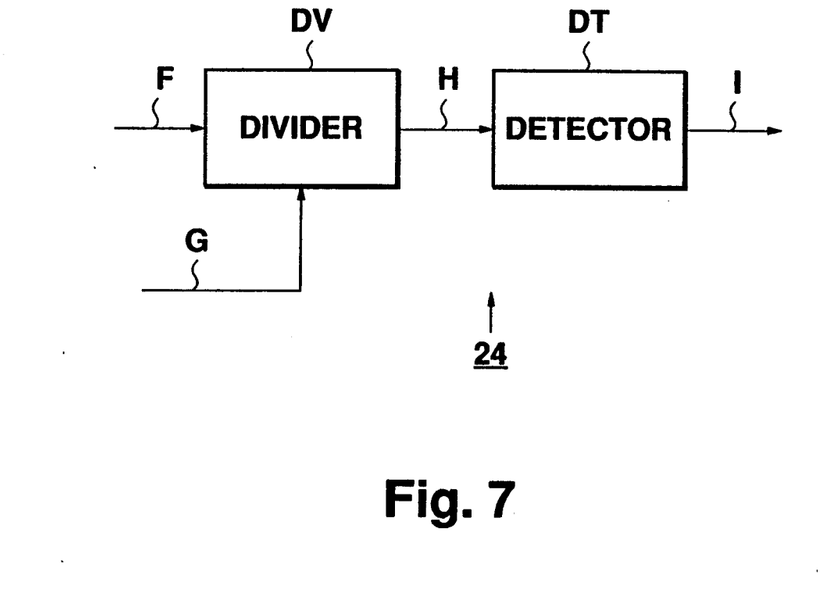
FIG. 7 is a diagram of the light wavelength selection and photo-electric conversion means of FIG. 5.

FIG. 7 shows one of the light wavelength selection and photo-electric transducers 24 in more detail. These transducers 24 not only choose the selected wavelengths of the receiving light according to a control signal G fed from control means 23 but also convert the light signals into electric signals. The transducer 24 shown in FIG. 7 includes a wavelength selection light-intercepting element such as a light divider DV. This light divider DV may be a Fabry-Perot type light divider, a Mach-Zehnder type light divider, or a grating type light divider. The transducer 21 also includes a photo-electric conversion light-intercepting element such as a light detector DT. The light detector DT may be a conventional photodiode. The light divider DV chooses a wavelength from the receiving light F, which includes a plurality of light signals with different wavelengths. The selection of a wavelength is specified by a light wavelength selection signal G. As such, a light signal H of a predetermined wavelength is output to light detector DT. Then, in the light detector DT, the light signal H, having the predetermined wavelength, is converted into a voltage signal I, which encodes an information string.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. An optical transmission system having a sending side and a receiving side, comprising:

first and second optical transmission lines;

a light signal transmitter arranged in the sending side for sending duplicate light signals in parallel down the first and second optical transmission lines;

phase difference detector arranged in the receiving side for receiving the light signals sent down the two optical transmission lines and for comparing light signals received from the respective optical transmission lines to detect a phase difference therebetween, said phase difference detector generating a phase difference signal indicating the detected phase difference; and wavelength change controller arranged in the sending side for controlling the light signal sending transmitter according to the phase difference signal to change the wavelengths at least one of the light signals to be sent over the first and second optical transmission lines so as to substantially diminish the phase difference between the light signals.

2. An optical transmission system as recited in claim 1, wherein the light signal transmitter further comprises a variable wavelength semiconductor laser.

3. An optical transmission system as recited in claim 1, wherein the light signals include a long frame pattern having a data length of at least twice a maximum transmission delay difference between the first and second optical transmission lines.

4. An optical transmission system as recited in claim 3, wherein the phase difference detector means compares the long frame pattern in the light signal sent over the first optical transmission line and the long frame pattern in the light signals sent over second optical transmission line to detect the phase difference between the light signals on the respective optical transmission lines.

5. An optical transmission system having a sending side and a receiving side, comprising:

first and second optical transmission lines;

a light signal transmitter arranged in the sending side for sending duplicate light signals in parallel down the first and second optical transmission lines, each light signal including a plurality of wavelengths;

light signal selector arranged in the receiving side for selecting light signals with predetermined wavelengths from the light signals received from the first and second optical transmission lines;

phase difference detector arranged in the receiving side for comparing the light signals received from the first and second optical transmission lines to detect a phase difference therebetween; and selection change means arranged in the receiving side for changing at least one selective wavelength selected by the light signal selector according to the phase difference detected by the phase difference detector and for relatively changing the selected wavelengths of the light signals sent from the two optical transmission lines.

6. An optical transmission system as recited in claim 5, wherein the light signals each include a long frame pattern with a data length of at least twice the maximum transmission delay difference between the first and second optical transmission lines.

7. An optical transmission system of claim 6, wherein the phase difference detector compares the long frame patterns in the light signals sent from the first and second optical transmission lines to detect the phase difference between the light signals on the respective optical transmission lines.

8. An optical transmission system as recited in claim 5, wherein the light signals to be transmitted via the optical transmission lines include light signals having a plurality of wavelengths, and the light signal selector further comprises a light divider for selecting a light signal with the predetermined wavelength from the input light signal.

9. An optical transmission system having a sending side and a receiving side, comprising:

first and second optical transmission lines;

an optical transmitter arranged in the sending side for transmitting light signals in parallel down the first and second optical transmission lines;

an optical receiver arranged in the receiving side for receiving the transmitted light signals;

phase difference detector for detecting a difference in phase at the receiving side between a light signal sent down the first optical transmission line and a corresponding light signal sent down the second optical transmission line; and a controller for changing the wavelengths of the light signals that are received by the optical receiver based on the detected phase difference.

10. An optical transmission system as recited in claim 9 wherein the optical receiver converts the light signals into electrical signals and the phase difference detects the phase difference from the converted electrical signals.

11. In an optical transmission system having a sending side, a receiving side and two optical transmission lines, a method of synchronizing duplicate light signals sent in parallel over the two optical transmission lines, comprising the steps of:

a) detecting a phase delay between when one of the light signal is received at the receiving end from a first of the optical transmission lines and when another of the light signals is received at the receiving end from the second of the optical transmission lines;

b) selecting the wavelengths of the light signals that are received at the receiving end so as to substantially diminish the phase delay between when the light signals are received on the respective optical transmission lines.

12. A method as recited in claim 11, wherein the selecting step further comprises transmitting a light signal of a selected wavelength down the first optical transmission line and transmitting a light signal of a second wavelength down the other optical transmission line.

13. A method as recited in claim 11, wherein the selecting step further comprises selecting at the receiving end what wavelength of light is detected from the first optical transmission line and what wavelength of light is detected from the other optical transmission line.

* * * * *